(12) United States Patent
McIntyre et al.

(10) Patent No.: US 9,714,180 B2
(45) Date of Patent: Jul. 25, 2017

(54) COMPOSITE MATERIAL FOR ABSORBING AND REMEDIATING CONTAMINANTS AND METHOD OF MAKING SAME

(75) Inventors: Gavin McIntyre, Troy, NY (US); Eben Bayer, Troy, NY (US); Christopher Scully, Troy, NY (US)

(73) Assignee: Ecovative Design LLC, Green Island, NY (US)

( * ) Notice: Subject to any disclaimer, the term of this patent is extended or adjusted under 35 U.S.C. 154(b) by 485 days.

(21) Appl. No.: 13/617,611

(22) Filed: Sep. 14, 2012

(65) Prior Publication Data

US 2013/0095559 A1    Apr. 18, 2013

Related U.S. Application Data

(60) Provisional application No. 61/573,927, filed on Sep. 14, 2011.

(51) Int. Cl.
| | | |
|---|---|---|
| *C12R 1/645* | (2006.01) | |
| *C02F 3/34* | (2006.01) | |
| *A01K 1/015* | (2006.01) | |
| *B01J 20/28* | (2006.01) | |
| *C02F 1/28* | (2006.01) | |
| *C02F 101/32* | (2006.01) | |
| *C02F 103/00* | (2006.01) | |

(52) U.S. Cl.
CPC ........... *C02F 3/347* (2013.01); *A01K 1/0152* (2013.01); *A01K 1/0157* (2013.01); *B01J 20/28016* (2013.01); *B01J 20/28033* (2013.01); *C02F 1/288* (2013.01); *B01J 2220/4806* (2013.01); *B01J 2220/4825* (2013.01); *B01J 2220/4831* (2013.01); *B01J 2220/4868* (2013.01); *C02F 1/286* (2013.01); *C02F 2101/32* (2013.01); *C02F 2101/327* (2013.01); *C02F 2103/001* (2013.01)

(58) Field of Classification Search
CPC .... C12N 1/14; G01N 2333/395; A23K 10/37; C12R 1/645
USPC .......................................... 435/254.1
See application file for complete search history.

(56) References Cited

U.S. PATENT DOCUMENTS

2008/0145577 A1 * 6/2008 Bayer et al. ................. 428/35.6

OTHER PUBLICATIONS

Chaudhary et al. Understanding rice hull ash as fillers in polymers: a review. Silicon Chemistry. 2002;1:281-289.*
Peng et al. Microbial biodegradation of polyaromatic hydrocarbons. FEMS Microbiol Rev. 2008;32:927-955.*
Norvell L. Fungi biology. Encyclopedia. 2002;1-2.*
Kamzolkina et al. Micromorphological features of Pleurotus pulmonarious (Fr.) Quel. and P. ostreatus (Jacq.) P. kumm. strains. in pure and binary culture with yeasts. Tsitologiia. 2006;48(2):153-160.*
Novoselova et al. Cocultivation of Pleurotus ostreatus (Jacq.) P. kumm. with yeasts. Moscow University Biological Sciences Bulletin. 2011;66(3):102-105.*

* cited by examiner

*Primary Examiner* — Lynn Y Fan
(74) *Attorney, Agent, or Firm* — Francis C. Hand; Carella, Byrne, Agnello

(57) ABSTRACT

The mat is formed of a saprophytic fungal strain and/or budding yeast, and a mass of particles wherein the fungus is characterized in producing an enzyme capable of breaking down polycyclic aromatic hydrocarbons. In a second embodiment, a mass of pellets is made from the mat for use in absorbing liquid animal waste.

1 Claim, 1 Drawing Sheet

Figure 1:
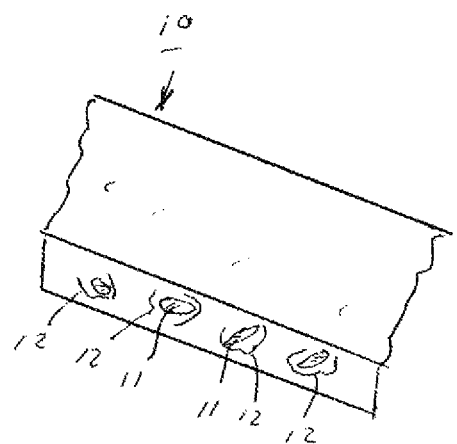

COMPOSITE MATERIAL FOR ABSORBING AND REMEDIATING CONTAMINANTS AND METHOD OF MAKING SAME

This application claims the benefit of Provisional Patent Application 61/573,927 filed Sep. 14, 2011.

This invention relates to a composite material for absorbing contaminants and a method of making same. More particularly, this invention relates to a composite material in mat form or in pellet form for absorbing contaminants.

As is known from published U.S. Patent Application 2008/0145577, use can be made of a fungus to form composite materials by mixing an inoculum including a preselected fungus with discrete particles and a nutrient material capable of being digested by the fungus.

It is an object of this invention to provide a composite material in mat form for absorbing contaminants.

It is another object of this invention to provide a composite material in mat form for absorbing petrochemical contaminants.

It is another object of this invention to provide a composite material in pellet form for absorbing contaminants.

It is another object of this invention to provide a composite material in pellet form for absorbing animal waste.

Briefly, the invention provides a composite material that in one embodiment is comprised of a saprophytic fungi strain and a mass of particles wherein the fungi forms a plurality of hyphae enveloping and surrounding the particles to form a thin dehydrated self-supporting mat.

In another embodiment, the composite material is comprised of a mass of pellets with each pellet composed of a saprophytic fungal strain and a particulate material wherein the fungus forms hyphae, collectively mycelium, bonded to the particulate material.

The saprophytic fungal strain used in accordance with the invention may be White Rot fungus from the phylum *Basidiomycota* (*Pluerotus ostreatus, Trametes versicolor*) or fungus from the phyla *Ascomycota* (*Penicillium ochrochloron*) and *Zygomycota* (*Rhizopus oryzae*).

In either case, where a mat of the composite material is to be used to break down petrochemicals or sequester metals, the saprophytic fungal strain is characterized in producing an enzyme capable of breaking down polycyclic aromatic hydrocarbons.

The mass of particles used for the composite material may be an agricultural waste, a mineral or an industrial waste.

The invention also provides a method of making a composite material for absorbing contaminants comprised of the steps of inoculating loose particles selected from at least one of agricultural waste and industrial waste with a saprophytic fungal strain; allowing the saprophytic fungal strain to grow hyphae to collectively proliferate, digest and bond the particles into a panel; heating the panel to render the saprophytic fungi strain inert; thereafter dehydrating the panel; and packaging the panel to prevent moisture from being absorbed in the panel.

In accordance with the method the dehydrated panel may also be comminuted into a mass of pellets, particularly for use in absorbing liquid animal waste.

Figure 2:
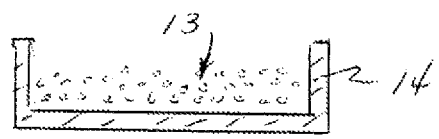

These and other objects and advantages of the invention will become more apparent from the following detailed description taken in conjunction with the accompanying drawings wherein:

FIG. 1 illustrates an enlarged broken perspective schematic view of a mat fabricated in accordance with the invention: and FIG. 2 illustrates a cross-sectional view of a cat litter box with a mass of pellets formed in accordance with the invention.

As is known, White Rot fungi from the phylum *Basidiomycota* (*P. ostreatus, T. versicolor*) are known to produce ligninolytic peroxidases, hydrolases, and laccases, enzymes that are used predominately for lignocellulosic decomposition. Furthermore, fungi from the phyla *Ascomycota* (*P. chrysosporium*) and *Zygomycota* (*C. elegans*), which are non-ligninolytic and ligninolytic respectively, secrete a similar series of enzymes.

The same enzymatic mechanisms are proven to breakdown specific chemical compounds that include polycyclic aromatic hydrocarbons (PAHs), thus granting the ability to bioremediate a contaminate. The prevalent chemical compounds are found in many consumer and industrial products which include, but are not limited to: urea, engine oils, diesel fuels, herbicides, ammonium fertilizers, and pesticides.

Referring to FIG. 1, the composite material is in the form of a mat 10 comprised of a saprophytic fungal strain and a mass of particles 11 wherein the fungus forms a plurality of hyphae 12 enveloping and surrounding the particles.

The mat 10 is characterized in being a thin dehydrated self-supporting mat 10, for example, being of a thickness of less than one inch.

The mat 10 may be stiff or flexible depending on the aspect ration of the enveloped particles and chemical plasticization of the fungal tissue using a polyol.

In order to form the mat 10, a mass of loose particles selected from at least one of agricultural waste and industrial waste is inoculated with a saprophytic fungi strain. In particular, the fungal strain is White Rot fungus from the phylum *Basidiomycota* (*P. ostreatus, T. versicolor*) or fungi from the phyla *Ascomycota* (*P. chrysosporium*) and *Zygomycota* (*C. elegans*). A yeast (*saccharomyces* sp.), a budding non-filamentous fungus, can be used solely or in conjunction with to further remediate animal wastes and contaminates. That is, the saprophytic fungal strain may cohabited with a budding yeast. Or may include fungi from different strains and filamentous plus a yeast.

Saprophytic fungi (*P. ostreatus, A. arvensis*) are lignocellulosic decomposers with hyphae (rhizoids) that secrete an enzyme to breakdown carbon-hydrogen bonds $(C_6H_{12}O_5)_x \rightarrow (H_2O)x + (CO_2)_x$.

The same enzyme can be used to breakdown other petrochemicals such as engine oils and machinery lubricants, which bioremediates the contaminate. The petrochemical is passively metabolized into carbon dioxide, water and other inert compounds/molecules and the fungi mycelium.

After inoculation, the saprophytic fungal strain is allowed to grow hyphae to collectively proliferate, digest and bond the particles into a panel (mat 10).

The panel is then heated to render the saprophytic fungi strain inert and dehydrated.

Next, the panel is packaged in a suitable package to prevent moisture from being absorbed in the panel that would otherwise reanimate the fungus.

The composition of the formed panel resembles a thin, stiff or flexible mat of a hydrophilic/hygrophilic combination of particles or fibers that are bound by a dense mycelium network (hyphae individually) in which the chemical or heavy metal $(Hg, Pb)_6$ is absorbed. The fungus bonder could potentially consist of one or more species of fungi, particular strain/enzymes produced could be based on application. The mycelium and particles are both hydrophilic and will absorb the contaminate (petrochemical).

In use, the mycelium will continue to grow initially metabolizing the easily accessed carbon in the hydrophilic particle (i.e. sawdust) then the carbon in the contaminate.

Particles or fibers that could be used, but are not limited to, are:

Agricultural Waste, i.e. cotton seed hulls, Coconut Coir

Minerals, i.e. perlite, vermiculite, diatomatius earth

Industrial Waste, i.e. sawdust, waste cellulose pulp (paper mill)

The mat 10 is grown in sheets and then dehydrated or freeze-dried to render the fungus/fungi inert until ready for use.

The mat 10 is sealed in packaging until ready for use to prevent water sorption and premature reanimation. When the mat 10 is used and the contaminates are soaked up, the mat 10 is misted/moistened with water to reanimate the fungi and start the metabolic process (the moistening of the mat can be a pre-process as well).

The compound(s) is passively metabolized into carbon dioxide, water, inert compounds/molecules, and fungi mycelium via an organic oxidation. The external inputs that are required are simply water and oxygen, which can be passively or actively applied.

After the contamination is converted into inert byproducts, the spent substrate can be easily composted or disposed of.

Possible other operations include returning the mat to its original sales bag or container and allowing the container to serve as the incubator/bioreactor while bioremediation takes place.

The bag could contain additional nutrients, minerals, and even additional inoculum to encourage growth, or to re-inoculate the substrate for fungi growth.

Applications:

Cars: Car owners to clean spills around the garage (changing oil)

Mechanics can use to dispose of the oil accumulated in the shop

Machinery: Farm equipment, machine shops (lubricants), household oil heaters

Animal Bedding: Can be utilized for pets (cats, birds) or larger animals (cows) to catch and absorb liquid excrement (urea, ammonia, ammonium). This material can then be composted or turned into a fertilizer for home garden/farm. Fungi mat could be dead or alive based on application.

Hospitals: Can be used in place of a dipper on beds, wheelchairs, or chairs, and the disposed of or composted. The fungi in these mats would be dead and sterilized.

Agriculture: Can be implemented on land or in waterways to passively collect runoff associated with organic/synthetic fertilizers. The fungi can breakdown the ammonium into the cellular body while the nitrate is collected in to the mat and reapplied as a fertilizer, reducing future costs.

Referring to FIG. 2, a mat 10 of FIG. 1 may be comminuted into a mass of pellets 13 of a size to be used as litter in a kitty box 14, and particularly to absorb liquid animal waste.

In use, the Fungi reanimate and metabolize contaminate, or in terms of a dead panel for wastes, the material (mat 10 or pellets 13) is disposed of via garbage.

Once contaminate is converted to inert byproducts, the mat 10 is composted, used as fertilizer, or disposed of through a different venue.

The invention thus provides a composite material in mat form for absorbing contaminants, particularly petrochemical contaminants.

The invention also provides a composite material in pellet form for absorbing contaminants, particularly liquid animal waste.

What is claimed is:

1. A composite material comprising a mass of pellets, each said pellet composed of a saprophytic fungi strain characterized in producing an enzyme capable of breaking down animal waste and a particulate material wherein said fungi forms a plurality of hyphae bonded to said particulate material.

* * * * *